US006573326B2

(12) United States Patent
Mayer et al.

(10) Patent No.: US 6,573,326 B2
(45) Date of Patent: Jun. 3, 2003

(54) THICKENERS BASED ON VINYL ALCOHOL COPOLYMERS

(75) Inventors: Theo Mayer, Julbach (DE); Werner Bauer, Winhöring (DE); Harald Zeh, Burghausen (DE); Bernd Kayser, Burghausen (DE); Andreas Bacher, Burghausen (DE); Ulf Dietrich, Altötting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/925,912

(22) Filed: Aug. 9, 2001

(65) Prior Publication Data

US 2002/0042459 A1 Apr. 11, 2002

(30) Foreign Application Priority Data

Aug. 17, 2000 (DE) .......................................... 100 40 178

(51) Int. Cl.⁷ ................................................ C08K 3/00
(52) U.S. Cl. ........................ 524/556; 524/557; 524/560; 524/561; 524/563; 524/564; 524/5
(58) Field of Search ................................. 524/503, 556, 524/557, 560, 561, 563, 564, 5

(56) References Cited

U.S. PATENT DOCUMENTS

| 4,043,961 | A | * | 8/1977 | Beresniewicz | ............. | 260/29.6 |
| 4,640,946 | A | * | 2/1987 | Vassallo | ........ | 524/45 |
| 5,118,751 | A | | 6/1992 | Schulze et al. | | |
| 5,387,641 | A | * | 2/1995 | Yeung | ........ | 524/557 |
| 5,565,027 | A | | 10/1996 | Shawl et al. | | |

FOREIGN PATENT DOCUMENTS

| AU | 1 234 240 | 6/1971 |
| AU | 1 235 000 | 6/1971 |
| DE | 1 091 336 | 10/1960 |
| DE | 37 81 256 T2 | 12/1992 |
| DE | 43 18 033 A1 | 12/1994 |
| EP | 0 220 491 A2 | 5/1987 |
| EP | 0 272 012 A2 | 6/1988 |
| EP | 0 275 081 A2 | 7/1988 |
| EP | 0 458 328 A1 | 11/1991 |
| EP | 0 477 900 A2 | 4/1992 |
| FR | 804 048 | 10/1936 |
| GB | 919425 | 2/1963 |

OTHER PUBLICATIONS

Derwent Abstract AN 1975–37058W [XP–002180660] Corresponding To SV–A 430111.
Chemical Abstracts, vol. 88, No. 12, Abstract No. 75032n [XP–002180659] Corresponding To JP–A 77057256.
Derwent Abstract AN 1984–246030 [XP–002180661] Corresponding To JP–A 59 146960.
European Search Report—Mailed Nov. 6, 2001.
Patent Abstracts of Japan Corresponding To JP–A 10–087937 [Apr. 7, 1998].
Patent Abstracts of Japan Corresponding To JP–A 08–319395 [Dec. 3, 1996].
Patent Abstracts of Japan Corresponding To JP–A 08–269132 [Oct. 15, 1996].
Derwent Abstract Corresponding To EP–A 0458328 [AN 1991–348034].
Derwent Abstract Corresponding To JP–B 54–027382 [1975—11530W].
English Abstract Corresponding To FR–A 804048.
Derwent Abstract Corresponding To DE–A 1091336 [1991:134690].
Derwent Abstract Corresponding To DE–A 4318033 [1995–007623].
Derwent Abstract Corresponding To JP–A 04–026533 [92–084292/11].
Derwent Abstract Corresponding To DE 3781256 [AN 1988–169289].

* cited by examiner

*Primary Examiner*—Edward J. Cain
(74) *Attorney, Agent, or Firm*—Brooks & Kushman P.C.

(57) ABSTRACT

The invention relates to thickeners based on fully or partially hydrolyzed vinyl alcohol copolymers with a molecular weight Mw greater than 100,000, obtainable by hydrolyzing vinyl acetate copolymers which, besides vinyl acetate units, also contain comonomer units which derive from one or more comonomers selected from the group consisting of 1-($C_{1-5}$)-alkylvinyl esters of $C_{1-5}$ carboxylic acids, allyl esters, vinyl esters of alpha-branched $C_{5-12}$ carboxylic acids, and $C_{1-18}$-alkyl (meth)acrylates, in the form of their aqueous solution or in powder form.

19 Claims, No Drawings

THICKENERS BASED ON VINYL ALCOHOL COPOLYMERS

BACKGROUND OF THE INVENTION

1. Field of the Invention

The invention relates to thickeners based on vinyl alcohol copolymers, and also to the use of these, in particular in compositions used in the building trades.

2. Background Art

Mixtures of lime hydrate and of cement are used for the masonry, rendering, troweling, bonding and restoration work carried out by the construction industry. Water-soluble polymers are added to the mixtures of lime hydrate and of cement to improve their workability and water-retention properties, with the intention of achieving very good workability and preventing the compositions of lime hydrate and of cement from losing water prior to setting on highly absorbent substrates. Premature loss of water leads to inadequate hardening or development of cracks in the construction material. The water-soluble polymers usually added are non-ionic cellulose ethers, such as methyl cellulose (MC), hydroxyethyl cellulose (HEC), methyl hydroxyethyl cellulose (MHEC), or methyl hydroxypropyl cellulose (MHPC).

For the purposes of the present invention, cellulose ethers are cellulose derivatives produced by the action of alkylating agents on cellulose in the presence of bases. Examples of alkylating agents are ethylene oxide, dimethyl sulfate, methyl chloride and methyl iodide. The only industrial method of preparing methyl celluloses is the reaction of alkali celluloses with methyl chloride, in the presence or absence of organic solvents, a process which generates toxicological concerns. The resultant cellulose ether therefore contains methanol, dimethyl ether, and relatively large amounts of sodium chloride as by-products. NaCl in particular can lead to corrosion problems in applications in the construction sector, and complicated purification processes therefore have to be used for its removal.

In applications in many other fields, cellulose ethers compete with entirely synthetic polymers, such as associative polyurethane thickeners, polyacrylates, polyamines, and polyamides, and also with naturally occurring water-soluble polymers, such as agar agar, tragacanth, carrageen, gum arabic, alginates, starch, gelatine, and casein. However, there have hitherto been no alternatives to cellulose ether for the workability and water-retention required for lime hydrate or cement-based compositions, in particular in cement-type systems with their high pH and high electrolyte content. A disadvantage of the cellulose ethers usually used in cement-type construction applications, in particular hydroxyethyl methyl cellulose, is that there is sometimes a considerable delay in cement setting. Although polyvinyl alcohols are known constituents of cement-type compositions, they are used only in a relatively low-molecular-weight form which cannot have any significant thickening effect. Although higher-molecular-weight polyvinyl alcohol polymers would be expected to have thickening properties, these polymers exhibit difficulties of low cold-water solubility and poor workability associated with this low solubility.

U.S. Pat. No. 5,565,027 discloses polyvinyl alcohols modified with hydroxyaldehydes used as cement plasticizers in cement-type systems. EP-A 272012 describes the use of vinyl alcohol copolymers as thickeners in aqueous systems such as emulsion paints, the copolymers containing not only vinyl alcohol units but also acrylic ester units having at least two ethylene oxide units in the ester radical. JP-A 10/087937 describes an improvement in the mechanical strength of cement-containing construction materials via addition of polyvinyl alcohol or of vinyl alcohol copolymers with defined solubility in aqueous $Ca(OH)_2$ solution. The vinyl alcohol copolymers contain carboxyl units, sulfonate units and N-vinyl units.

JP-A 08/319395 describes the use of a composition made from alkali metal acetate salt and a vinyl alcohol copolymer having acetylacetone units as a thickener for polymer emulsions. JP-A 08/269132 describes fine-particle size, pulverulent vinyl alcohol homo- or copolymers with a defined proportion of syndiotactic, rather than the usual atactic, conformation, for improving the water-resistance of compositions modified with the same. JP-B 54-27382 describes a process for thickening copolymer dispersions based on carboxyl-functionality copolymers, where partially hydrolyzed polyvinyl alcohol is added. EP-A 458328 describes a thickener system intended for water-containing construction materials and composed of a combination of cellulose ether, polyvinyl alcohol and borax, its action being based on complex formation between polyvinyl alcohol and borax.

SUMMARY OF THE INVENTION

It was an object of the invention to provide an entirely synthetic water-soluble polymer which acts as a thickener in formulations used in civil engineering, and in particular in cement-type formulations, which produces formulations displaying excellent workability and mechanical properties, but which does not have the abovementioned disadvantages.

DETAILED DESCRIPTION OF THE PREFERRED EMBODIMENT(S)

The invention provided thickeners based on fully or partially hydrolyzed vinyl alcohol copolymers with a molecular weight Mw greater than 100,000, obtainable by hydrolyzing vinyl acetate copolymers which, besides vinyl acetate units, also contain comonomer units which derive from one or more comonomers selected from the group consisting of 1-($C_{1-5}$)-alkylvinyl esters of $C_{1-5}$ carboxylic acids, allyl esters, vinyl esters of alpha-branched $C_{5-12}$ carboxylic acids having from 5 to 12 carbon atoms, and $C_{1-18}$-alkyl (meth)acrylates, and in the form of their aqueous solution or in powder form. As is common in polymer chemistry, polymers may be described in terms of their constituent monomers without using language such as "units derived from" those monomers. Thus, a polymer derived from vinyl acetate monomer may be described as a vinyl acetate polymer even though once polymerized, the polymer will not contain vinyl acetate moieties.

The preferred 1-alkylvinyl ester is isopropenyl acetate. Preferred vinyl esters of alpha-branched carboxylic acids are those of alpha-branched carboxylic acids having from 9 to 11 carbon atoms, and particular preference is given to vinyl esters of alpha-branched carboxylic acids having 10 carbon atoms (VeoVa10, trade name of Shell). Preferred acrylic and methacrylic esters are those of $C_{1-10}$ alcohols. Particular preference is given to methyl acrylate, ethyl acrylate, butyl acrylate, 2-ethylhexyl acrylate, methyl methacrylate, and 2-ethylhexyl methacrylate. From 0.05 to 2% by weight of auxiliary monomers, based on the total weight of the monomer mixture, may also be copolymerized. Examples of auxiliary monomers are ethylenically unsaturated mono- and dicarboxylic acids, preferably acrylic acid, methacrylic acid, fumaric acid, crotonic acid or maleic acid; ethylenically unsaturated carboxamides and ethylenically unsaturated carbonitriles, preferably acrylamide or acrylonitrile; cyclic carboxamides, such as N-vinylpyrrolidone and N-vinyl-ε-caprolactam, and ethylenically unsaturated carboxylic anhydrides, preferably maleic anhydride.

The degree of hydrolysis of the partially or fully hydrolyzed vinyl alcohol copolymers is generally from 75 to 100 mol %; in the case of "fully hydrolyzed" vinyl alcohol copolymers it is preferably from 97.5 to 100 mol %, more preferably from 98 to 99.5 mol %; and in the case of partially hydrolyzed vinyl alcohol copolymers it is preferably from 80 to 95 mol %, more preferably from 86 to 90 mol %. The proportion of comonomer units is from 0.1 to 50% by weight, preferably from 0.3 to 15% by weight, and most preferably from 0.5 to 6% by weight, based in each case on the total weight of the vinyl alcohol copolymer.

Particular preference is given to vinyl alcohol copolymers obtainable by hydrolyzing vinyl acetate copolymers having from 0.3 to 15% by weight of isopropenyl acetate, vinyl esters of alpha-branched $C_{9-11}$ carboxylic acids, methyl, ethyl, butyl or 2-ethylhexyl acrylate, or 2-ethylhexyl methacrylate, or methyl methacrylate. Particular preference is also given to copolymers having from 0.3 to 15% by weight of isopropenyl acetate, units and from 0.3 to 15% by weight of units of vinyl esters of alpha-branched $C_{9-11}$ carboxylic acids having from 9 to 11 carbon atoms. Finally, particular preference is also given to vinyl alcohol copolymers having from 0.5 to 6% by weight of isopropenyl acetate, from 0.5 to 6% by weight of vinyl esters of alpha-branched $C_{10}$ carboxylic acids (VeoVa10), and from 0.5 to 6% by weight of methyl acrylate, and also to vinyl alcohol copolymers having from 0.5 to 6% by weight of isopropenyl acetate, from 0.5 to 6% by weight of 2-ethylhexyl methacrylate, and from 0.5 to 6% by weight of methyl acrylate.

The vinyl alcohol copolymers may be prepared by known processes, such as bulk, solution, suspension or emulsion polymerization. Solution polymerization preferably takes place in alcoholic solution, for example in methanol, ethanol or isopropanol. Suspension polymerization and emulsion polymerization are carried out in an aqueous medium. The polymerization is preferably carried out at a temperature of from 5 to 90° C. with free-radical initiation by adding initiators usually used for the respective polymerization process. The vinyl alcohol units are introduced into the copolymer by copolymerization of vinyl acetate, the acetate radicals being hydrolyzed in a subsequent hydrolysis step in the same manner as other hydrolyzable monomer units. The molecular weight may be adjusted by adding regulators (i.e. chain transfer agents), by varying the solvent content, by varying the initiator concentration, by varying the temperature, or by combinations of the foregoing. After completion of the polymerization, solvent is removed by distillation where appropriate, or the polymer may be isolated from the aqueous phase by filtration.

The hydrolysis takes place in the conventional manner, under alkaline or acidic conditions established by addition of base or acid. The vinyl acetate copolymer to be hydrolyzed is preferably dissolved in alcohol such as methanol, at a solids content of from 5 to 50%. The hydrolysis is preferably carried out under basic conditions, for example by adding NaOH, KOH, or $NaHCO_3$. The resultant vinyl alcohol copolymer may be isolated from the reaction mixture by filtration or distillation of the solvent mixture. The filtered product is then dried and ground by conventional methods.

It is also possible to obtain an aqueous solution by adding water, advantageously in the form of superheated steam, during the distillation of the organic solvents. For the work-up of an aqueous solution, preference is given to spray drying and to precipitation of the vinyl alcohol copolymer, for example using methanol. Work-up continues with a drying step and a grinding step. Grinding generally proceeds until the resultant average particle size is less than 1 mm, preferably less than 200 μm.

The thickener may be used as an aqueous solution or in powder form, or as an additive in aqueous polymer dispersions or in water-redispersible polymer powders. It may be used alone or in admixture with other rheology additives. The amount of the thickener generally used is from 0.01 to 20% by weight of thickener composition (solid), based on the total weight of the composition to be thickened. The thickener is suitable for use as a thickener in any sector where rheological auxiliaries are used, for example as a thickener in cosmetics, in the pharmaceutical sector, in water-based silicone emulsions, in silicone oils, in coating compositions such as emulsion paints or textile coatings, as a thickener in adhesive compositions, or as a thickener in construction applications, either in hydraulically setting compositions or in non-hydraulically setting compositions, for example concrete, cement mortar, lime mortar, or gypsum mortar. There are other possible applications in water-containing mixes which also use cellulose ethers and starch ethers as thickeners. Particular preference is given to the construction applications. Very particular preference is given to cement-type construction applications, such as cement-type construction adhesives (tile adhesives), cement-type dry mortars, cement-type flowable compositions, cement-type renders, and cement-type exterior insulation system adhesives and cement-type non-shrink grouts.

Typical mixes for cement-type construction adhesives comprise from 5 to 80% by weight of cement, from 5 to 80% by weight of fillers such as quartz sand, calcium carbonate or talc, from 0.5 to 60% by weight of polymer dispersion or redispersible polymer powder, from 0.1 to 5% by weight of thickeners, and, where appropriate, other additives for improving stability, workability, open time, and water resistance. The data given here in % by weight are always based on 100% by weight of dry material of the mix and give a total of 100% by weight. The cement-containing construction adhesive mixes mentioned are used especially as tile adhesives for tiles of any type (earthenware, stoneware, porcelain, ceramics, natural tiles), indoors or outdoors, and are mixed with the appropriate amount of water prior to use.

The thickeners of the invention are also suitable for use in cement-free construction mixes, for example with the appropriate amount of gypsum or water glass as inorganic binder, and preferably in gypsum-containing compositions, such as gypsum renders and gypsum troweling compositions. The cement-free mixes are used especially in troweling compositions, tile adhesives, exterior insulation system adhesives, renders, and paints. Typical mixes for gypsum formulations comprise from 15 to 96% by weight of calcium sulfate, from 3 to 80% by weight of fillers, such as quartz sand, calcium carbonate or talc, from 0 to 5% by weight of hydrated lime, from 0 to 5% by weight of polymer dispersion or polymer powder, and also from 0.01 to 3% by weight of thickeners, and, where appropriate, other additives for improving stability, workability, open time and water resistance. The data in % by weight are always based on 100% by weight of dry material of the mix and give a total of 100% by weight.

In cement-type construction compositions, such as tile adhesives, the thickeners of the invention the are found to produce cement-type compositions of excellent workability and mechanical properties even without further rheological additives such as methyl hydroxyethyl cellulose. Until now, only partial replacement of cellulose ethers in cement-type construction formulations has been possible, for example by starch thickeners or water-soluble polyacrylates, but with considerable loss of technical quality in the construction composition. Using the thickener of the invention, up to 100% of the cellulose ethers can be replaced in cement-type applications without any losses in quality.

The examples below give further illustration of the invention.

EXAMPLE 1

612 g of water, 61.2 mg of copper(II) acetate, and 61.2 g of a 5% strength polyvinylpyrrolidone solution (PVP-K90) form an initial charge in water under nitrogen in a laboratory apparatus of 2.5 liter capacity, fitted with a thermostat. A solution of 620 mg of tert-butyl 2-ethylperhexanoate (TBPEH), 322 mg of tert-butyl perneodecanoate (TBPND), and 6.12 g of VeoVa10 in 612 g of vinyl acetate was added, with stirring. The reactor was heated to 51.5° C. and, once the reaction had subsided, stepwise to 75° C. The mixture was held for a further 2 hours at this temperature and then cooled. The resultant polymer beads were filtered off with suction, washed well with water, and dried.

90 g of the polymer beads were dissolved in 810 g of methanol at 50° C. in a laboratory reactor of 2.5 liter capacity. The solution was cooled to 30° C., and with the stirrer not operating, covered with 500 g of methanol and immediately mixed with methanolic NaOH (10 g of NaOH (46% strength in water) dissolved in 90 g of methanol), and the stirrer energized. The solution became increasingly cloudy. During the gel phase, the stirrer was set to a higher rotation rate in order to comminute the gel. After the gel phase, the reaction was continued for a further 2 hours followed by neutralization with acetic acid, and the resultant solid was separated by filtration washed, dried and ground, yielding a vinyl acetate-VeoVa10 copolymer with a degree of hydrolysis of 99.5% and a molecular weight Mw of greater than 100,000.

EXAMPLE 2

The procedure of example 1 was followed, but 18.4 g of isopropenyl acetate, instead of 6.12 g of VeoVa 10, were dissolved in the vinyl acetate. Work-up followed that of example 1, yielding a vinyl acetate-isopropenyl acetate copolymer with a degree of hydrolysis of 99.2% and a molecular weight Mw greater than 100 000.

EXAMPLE 3

Example 2 was repeated, but 33.7 g of isopropenyl acetate were employed. Work-up followed that of example 1, yielding a vinyl acetate-isopropenyl acetate copolymer with a degree of hydrolysis of 99.7% and a molecular weight Mw greater than 100,000.

EXAMPLE 4

Example 1 was repeated, but, in addition to the 6.12 g of VeoVa 10, 18.4 g of isopropenyl acetate were also dissolved in the vinyl acetate. Work-up followed that of example 1, yielding a vinyl acetate-VeoVa10-isopropenyl acetate copolymer with a degree of hydrolysis of 99.6% and a molecular weight Mw greater than 100,000.

EXAMPLE 5

Example 1 was repeated, but, in addition to the 6.12 g of VeoVa 10, 30.6 g of isopropenyl acetate were also dissolved in the vinyl acetate. Work-up followed that of example 1, yielding a vinyl acetate-VeoVa10-isopropenyl acetate copolymer with a degree of hydrolysis of 99.4% and a molecular weight Mw greater than 100,000.

EXAMPLE 6

900 g of water, 90.0 mg of copper(II) acetate and 90.0 g of a 5% strength polyvinylpyrrolidone solution (PVP-K90) formed an initial charge under nitrogen in a laboratory apparatus of 2.5 liter capacity, equipped with a thermostat. A solution of 909 mg of tert-butyl 2-ethylperhexanoate (TBPEH), 600 mg of tert-butyl perpivalate (PPV), 27.0 g of isopropenyl acetate, 9.0 g of methyl acrylate and 9.0 g of VeoVa10 in 900 g of vinyl acetate was added, with stirring. The reactor was heated to 56° C., and after the reaction had subsided the mixture was heated stepwise to 70° C., followed by holding at this temperature for 2 more hours, and then cooled. The resultant beads were filtered off with suction, washed well with water, and dried.

90 g of the polymer beads were then dissolved in 810 g of methanol at 50° C. in a laboratory reactor of 2.5 liter capacity. The solution was cooled to 30° C., covered with 500 g of methanol while the stirrer remained stationary and then immediately mixed with methanolic NaOH (10 g of NaOH (46% strength in water) in 90 g of methanol), and the stirrer energized. The solution became increasingly cloudy. During the gel phase, the stirrer was set to a higher rotation rate in order to comminute the gel. After the gel phase, the reaction was continued for 2 more hours, neutralized with acetic acid, and the resultant solid was separated by filtration washed, and dried, yielding a vinyl acetate-VeoVa10-methyl acrylate-isopropenyl acetate copolymer with a degree of hydrolysis of 99.5% and a molecular weight Mw greater than 100,000.

EXAMPLE 7

Example 6 was repeated, but 18 g of methyl acrylate were added to the vinyl acetate. Work-up followed that of example 6, yielding a vinyl acetate-VeoVa10-methyl acrylate-isopropenyl acetate copolymer with a degree of hydrolysis of 99.4% and a molecular weight Mw greater than 100,000.

EXAMPLE 8

The reaction was carried out using the constituents of example 7 with 821 g of vinyl acetate forming an initial charge. The reactor was heated to 62° C. and once the reaction had started 19 g of methyl acrylate dissolved in 74 g of vinyl acetate were slowly added dropwise. Once the reaction had subsided, the mixture was heated stepwise to 70° C. The mixture was held for a further 2 hours at this temperature and then cooled. The resultant beads were filtered off with suction, washed well with water, and dried. Subsequent work-up was based on example 1, yielding a vinyl acetate-VeoVa10-isopropenyl acetate-methyl acrylate copolymer with a degree of hydrolysis of 99.9% and a molecule weight Mw greater than 100,000.

Comparative Example 9

Commercially available hydroxyethyl methyl cellulose with a Höppler viscosity of 6,000 mPa·s (2% by weight solution in water)

Comparative Example 10

Commercially available hydroxyethyl methyl cellulose with a Höppler viscosity of 40 000 mPa·s (2% by weight solution in water)

Comparative Example 11

Commercially available hydroxyethyl methyl cellulose with a Höppler viscosity of 15 000 mPa·s (2% by weight solution in water)

Comparative Example 12

Commercially available, fully hydrolyzed polyvinyl alcohol with a degree of hydrolysis of 99.5 mol % and a molecular weight Mw greater than 200,000.

EXAMPLE 13

Example 2 was repeated, but instead of VeoVa10 an identical amount of 2-ethylhexyl methacrylate was copolymerized. Work up was based on example 1, yielding a vinyl acetate-2-ethylhexyl methacrylate copolymer with a degree of hydrolysis of 99.6% and a molecular weight Mw greater than 100,000.

Testing of Thickeners

The thickeners were tested in the following formulation:
55.2 parts by weight of quartz sand No. 9a (0.1–0.4 mm),
43.0 parts by weight of cement 42.5 (Rohrdorfer),
1.5 parts by weight of redispersible polymer powder (Vinnapas® RE 530 Z),
0.7 part by weight of thickener.

The dry mixture was mixed with the amount of water given in table 1 and the mixture was allowed to stand for 5 minutes, and then tested. The test results are given in table 1.

Determination of Plasticity

The plasticity of the mixture was determined qualitatively by stirring the formulation. Results were evaluated on a grading scale from 1 to 6, grade 1 being the best.

Determination of Wetting Properties

To determine wetting properties, the formulation was applied to a fiber-reinforced concrete panel using a serrated trowel, and the wetting of the panel was assessed qualitatively. Results were evaluated on a grading scale from 1 to 6, grade 1 being the best.

Determination of Quality of Bead Production

The formulation was applied to a fiber-reinforced concrete panel using a serrated trowel, and the quality of the resultant beads was assessed qualitatively. Results were evaluated on a grading scale from 1 to 6, grade 1 being the best.

Determination of Water Retention

Water retention was determined to DIN 18555 Part 7. Table 1 gives the proportion of water which remained in the formulation.

Determination of Break-out

The tile adhesive formulation was applied to a fiber-reinforced concrete panel, onto which a tile (5 cm×5 cm) was laid after 10 minutes and which was loaded with a weight of 2 kg for 30 seconds. After a further 60 minutes, the tile was removed and the percentage of the reverse side of the tile still covered with adhesive was determined.

Determination of Stability (Slip Test)

For the slip test, a tile (15 cm×15 cm) was placed into the tile adhesive formulation and was loaded with a 5 kg weight for 30 seconds, and the sample structure was placed vertically. The upper edge of the tile was then loaded with weights, in each case for 30 seconds, and the weight at which the tile slips was determined.

Determination of Cement-setting Performance

Cement-setting performance was determined using a heat sensor in the tile adhesive formulation. The time taken for setting to begin was determined, and the retardation (values greater than 100) or the acceleration (values less than 100) of setting was determined relative to that of a formulation with no thickener.

Discussion of Test Results

The test results show that thickeners of the invention based on the vinyl alcohol copolymers (examples 1 to 8, 13) give markedly better workability (plasticity, wetting, bead quality) than conventional polyvinyl alcohol (comparative example 12), and significantly better thickening effect (break-out, water retention, stability). Compared with conventional thickeners based on cellulose ethers (comparative examples 9 to 11), the vinyl alcohol copolymer gives markedly accelerated setting performance (cement setting).

TABLE 1

| Example | Water (g) | Plasticity | Wetting | Bead quality | Break-out (%) | Water Retention (%) | Slip (g) | Cement setting (%) |
|---|---|---|---|---|---|---|---|---|
| 1 | 23.5 | 2 | 2 | 2 | 91 | 98.0 | 400 | 105 |
| 2 | 23.0 | 1 | 1 | 1.5 | 96 | 98.2 | 400 | 96 |
| 3 | 23.3 | 1.5 | 1.5 | 1.5 | 91 | 98.0 | 200 | 96 |
| 4 | 23.0 | 1.5 | 1 | 1 | 94 | 97.7 | 200 | 90 |
| 5 | 22.9 | 1 | 1 | 1 | 94 | 98.0 | 200 | 98 |
| 6 | 24.2 | 1 | 1 | 1 | 92 | 97.4 | 400 | 98 |
| 7 | 27.0 | 1 | 1 | 2 | 93 | 97.3 | 400 | 110 |
| 8 | 22.2 | 1 | 1 | 1 | 82 | 97.6 | 400 | 95 |
| Comp. Ex. 9 | 23.0 | 2.5 | 2.5 | 1.5 | 98 | 98.5 | 200 | 185 |
| Comp. Ex. 10 | 26.0 | 3 | 2 | 1.5 | 95 | 98.3 | 400 | 170 |
| Comp. Ex. 11 | 23.5 | 2 | 2 | 1.5 | 92 | 98.3 | 400 | 198 |
| Comp. Ex. 12 | 22.9 | 3.5 | 4.5 | 5 | 25 | 96.5 | 400 | 120 |
| 13 | 24.3 | 1 | 1 | 1.5 | 95 | 98.5 | 400 | 95 |

Testing of the thickeners in gypsum-containing mixes (gypsum renders) was carried out with the following formulation:

| | |
|---|---|
| Calcium sulfate (Primoplast - Hilliges Gipswerk) | 700 g |
| Quartz sand (No. 7; 0.2–0.7 mm) | 237.6 g |
| Perlite light-weight filler (3 mm) | 25 g |
| Hydrated lime (Walhalla) | 35 g |
| Retarder (Retardan, aminobutyraldehyde condensate) | 0.4 g |
| Thickener | 2 g |

Test Methods

The test results are given in Table 2.

Determination of Air Pore Content

Air pore content was determined to DIN 18555 Part 2.

Determination of Water Retention

Water retention was determined to DIN 18555 Part 7.

Plasticity

The plasticity of the mixture was determined qualitatively by stirring the formulation. The results were evaluated on a grading scale from 1 to 6, grade 1 being the best.

Stability

The stability of the formulation was determined qualitatively by passing a trowel through the mixture. The results were evaluated on a grading scale from 1 to 6, grade 1 being the best.

Post-thickening

The post-thickening of the formulation was assessed qualitatively after a waiting time of 5 minutes. The results were evaluated on a grading scale from 1 to 6, grade 1 being the best.

Start of Setting (SS), Completion of Setting (CS)

The time taken for setting to begin was determined by means of a needle repeatedly inserted into the formulation. The start of setting is the juncture at which the depth of insertion of the needle begins to be smaller, with the same force exerted. Once the setting had been completed, it was no longer possible to insert the needle by exerting the same force.

Felting Time

The formulation was troweled onto a brick wall and smoothed with a timber batten after a waiting time. The render was then felted using a moistened sponge. The felting time is the time from which felting can be begun without breaking up the render (measured from application of the formulation).

Slump

The formulation is placed in a settling funnel on a slump table to DIN 1060 Part 3, and the slump of the mixture is measured 1 minute after removing the funnel, and also after using 15 impacts to vibrate the specimen.

Shrinkage

Test specimens are prepared from the mixture, and the change in length of the longitudinal axis of the prisms is determined after 28 days using a test device to DIN 52450.

TABLE 2

| Thickener | $H_2O$ (g) | $H_2O$ retention (%) | Air pores (%) | Slump (cm) | Slump after vibration (cm) |
|---|---|---|---|---|---|
| Ex. 4 | 425 | 98.2 | 10.1 | 10 | 15.7 |
| C. ex. 9 | 420 | 98.9 | 8.8 | 10 | 15.5 |

| Thickener | SS (min) | CS (min) | Post-thickening | Plasticity | Stability | Shrinkage (mm/m) | Felting time (min) |
|---|---|---|---|---|---|---|---|
| Ex. 4 | 100 | 115 | 1 | 1.5 | 1.5 | 0.244 | 55 |
| C. ex. 9 | 100 | 120 | 1 | 2.0 | 3.0 | 0.258 | 55 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. By the terms "a" and "an" are meant "one or more" unless specified otherwise.

What is claimed is:

1. A thickener based on fully or partially hydrolyzed vinyl alcohol copolymers with a molecular weight Mw greater than 100,000, consisting essentially of hydrolyzed vinyl acetate copolymers which, besides vinyl acetate units, also contain comonomer units selected from 1-($C_{1-5}$)-alkylvinyl esters of $C_{1-5}$ carboxylic acids, allyl esters, vinyl esters of alpha-branched $C_{5-12}$ carboxylic acids, ethyl acrylate, butyl acrylate, 2-ethylhexyl acrylate, and 2-ethylhexyl methacrylate and optionally up to about 2 weight percent of auxiliary monomers, in the form of their aqueous solution or in powder form, each comonomer present in an amount of from 0.3 to 15 weight percent, said weight percents based on the total weight of all monomers and totaling 100 weight percent.

2. The thickener of claim 1, wherein one or more comonomer units selected from isopropenyl acetate, vinyl esters of alpha-branched $C_{9-11}$ carboxylic acids, and $C_{1-10}$-alkyl (meth)acrylates are present in said copolymer.

3. The thickener of claim 1, wherein the degree of hydrolysis of the partially or fully hydrolyzed vinyl alcohol copolymers is from 75 to 100 mol %.

4. The thickener of claim 2, wherein the degree of hydrolysis of the partially or fully hydrolyzed vinyl alcohol copolymers is from 75 to 100 mol %.

5. The thickener of claim 1, wherein said vinyl alcohol copolymers are selected from one or more of:
   vinyl alcohol copolymers having from 0.3 to 15% by weight of any of isopropenyl acetate, vinyl esters of alpha-branched $C_{9-11}$ carboxylic acids, methyl, ethyl, butyl or 2-ethylhexyl acrylate, or 2-ethylhexyl methacrylate;
   vinyl alcohol copolymers having from 0.3 to 15% by weight of isopropenyl acetate units and from 0.3 to 15% by weight of vinyl esters of alpha-branched $C_{9-11}$ carboxylic acids; and
   vinyl alcohol copolymers having from 0.5 to 6% by weight of isopropenyl acetate, from 0.5 to 6% by weight of vinyl esters of alpha-branched $C_{10}$ carboxylic acids, and from 0.5 to 6% by weight of methyl acrylate.

6. A process for preparing the thickeners of claim 1 comprising copolymerizing vinyl acetate with one or more comonomers selected from the group consisting of 1-($C_{1-5}$)-alkylvinyl esters of $C_{1-5}$-carboxylic acids, vinyl esters of alpha-branched $C_{1-5}$ carboxylic acids having from 5 to 12 carbon atoms, ethyl acrylate, butyl acrylate, 2-ethylhexyl acrylate, and 2-ethylhexyl methacrylate, by free-radical-initiated bulk, solution, suspension, or emulsion polymerization at a temperature of from 5 to 90° C., and hydrolyzing the resultant vinyl acetate copolymer in a subsequent hydrolysis step.

7. In a cosmetic composition, a pharmaceutical composition, a water-based silicone emulsion, a silicone oil, a coating composition, an adhesive composition, or in a construction composition, said compositions employing a thickener, the improvement comprising employing as said thickener a thickener of claim 1 as an aqueous solution, in powder form, as an additive in aqueous polymer dispersion, or in water redispersible powders, in amounts of from 0.01 to 5% by weight of thickener (solid), based on the total weight of the composition to be thickened.

8. In a construction adhesive composition which is a hydraulically setting or non-hydraulically setting cementitious-, gypsum-, or water glass-containing construction application composition, the improvement comprising adding to said adhesive a thickener composition comprising a fully or partially hydrolyzed vinyl alcohol copolymer with a molecular weight Mw greater than 100,000 and comprising hydrolyzed vinyl acetate copolymers which, besides vinyl acetate units, also contain comonomer units selected from 1-($C_{1-5}$)-alkylvinyl esters of $C_{1-5}$ carboxylic acids, allyl esters, vinyl esters of alpha-branched $C_{5-12}$ carboxylic acids, and $C_{1-18}$-alkyl (meth)acrylates, in the form of their aqueous solution or in powder form.

9. The construction composition of claim 8, wherein said composition comprises a cement-based construction adhesive, a cement-based dry mortar, a cement-based flowable composition, a cement-based render, a cement-based exterior insulation system adhesive, or a cement-based non-shrink grout.

10. The construction composition of claim 8, wherein said composition comprises a cement-free troweling composition, a render, a tile adhesive, or an exterior insulation system adhesive.

11. The construction composition of claim 8, wherein said composition is a gypsum-containing composition.

12. The construction composition of claim 11, wherein said composition is a render or a troweling composition.

13. The construction composition of claim 7, wherein said composition further comprises a water-redispersible redispersion powder.

14. A thickener comprising a vinyl alcohol copolymer having, in addition to vinyl alcohol moieties from 0.5 to 6% of isopropenyl acetate moieties, from 0.5 to 6% by weight of 2-ethylhexyl methacrylate moieties, and from 0.5 to 6% by weight of methyl acrylate moieties, said %s by weight relative to total copolymer weight, said copolymer having a molecular weight Mw greater than 100,000.

15. In a cementitious, water glass-based, or gypsum-based construction adhesive, the improvement comprising adding thereto the thickener of claim 1.

16. In a cementitious, water glass-based, or gypsum-based construction adhesive, the improvement comprising adding thereto the thickener of claim 5.

17. In a cementitious, water glass-based, or gypsum-based construction adhesive, the improvement comprising adding thereto the thickener of claim 14.

18. The construction adhesive of claim 15, wherein said thickener comprises, in addition to vinyl alcohol moieties, moieties derived from vinyl esters of $\alpha$-branched $C_{5-12}$ carboxylic acids.

19. The construction adhesive of claim 18, wherein said copolymer further comprises moieties derived from isopropenyl acetate.

* * * * *